Sept. 10, 1963  A. H. LAIDIG  3,103,397
LAMP-FABRICATING APPARATUS
Original Filed May 19, 1960  5 Sheets-Sheet 2

INVENTOR.
ALFRED H. LAIDIG
BY
ATTORNEY.

Sept. 10, 1963        A. H. LAIDIG        3,103,397
LAMP-FABRICATING APPARATUS
Original Filed May 19, 1960        5 Sheets-Sheet 3
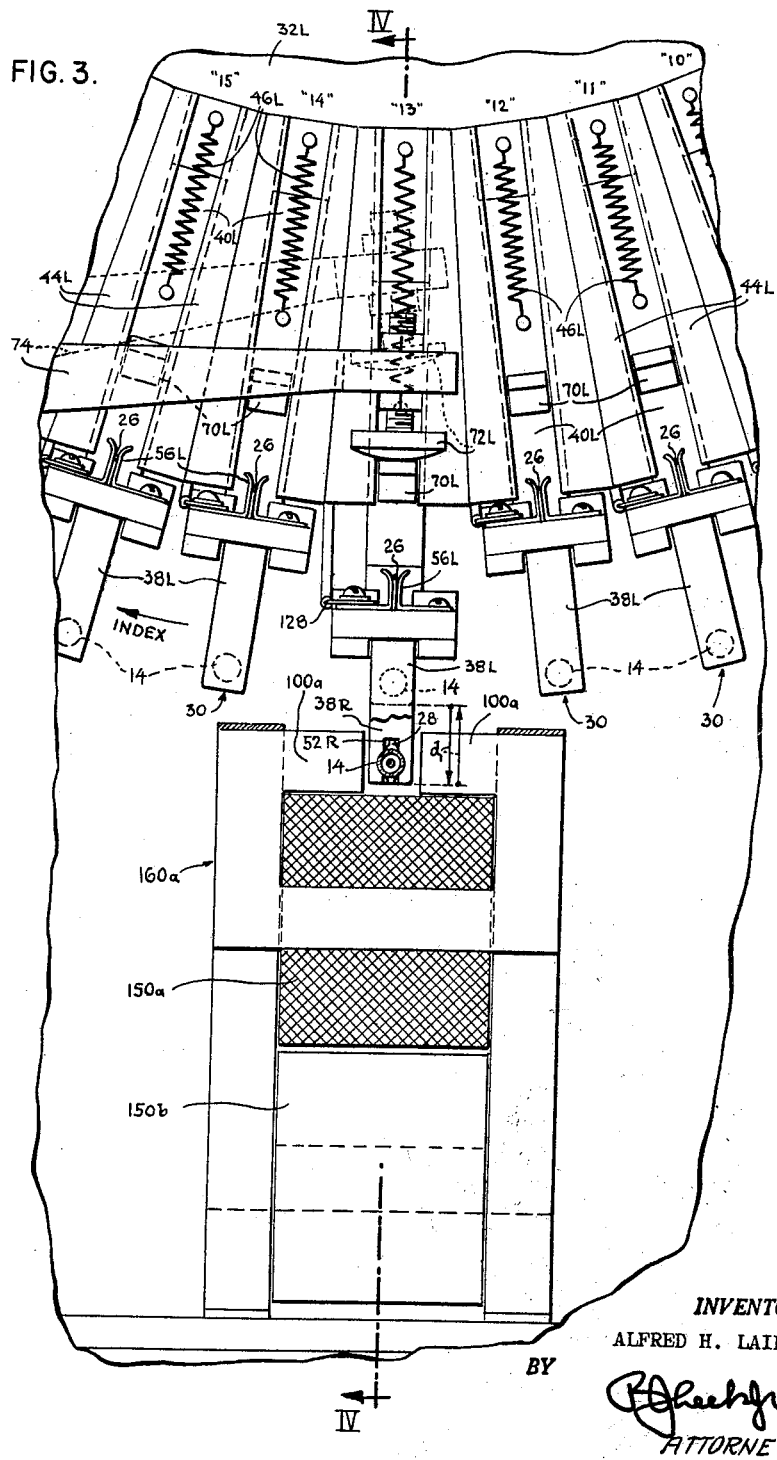
*INVENTOR.*
ALFRED H. LAIDIG
BY
*ATTORNEY*

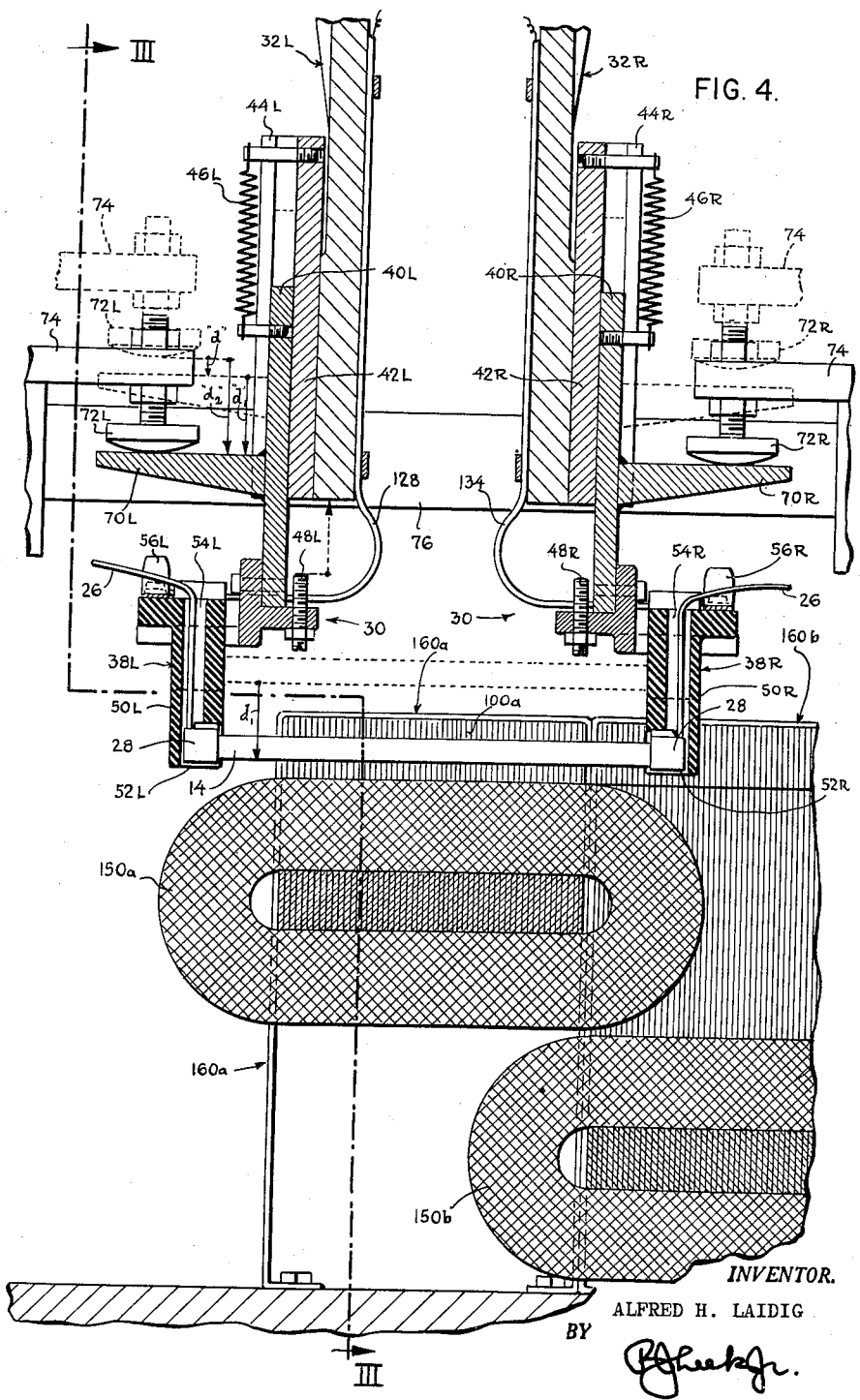

Sept. 10, 1963  A. H. LAIDIG  3,103,397
LAMP-FABRICATING APPARATUS
Original Filed May 19, 1960  5 Sheets-Sheet 5

INVENTOR.
ALFRED H. LAIDIG
BY
*[signature]*
ATTORNEY.

United States Patent Office 3,103,397
Patented Sept. 10, 1963

3,103,397
LAMP-FABRICATING APPARATUS
Alfred H. Laidig, Bloomfield, N.J., assignor to Westinghouse Electric Corporation, East Pittsburgh, Pa., a corporation of Pennsylvania
Continuation of application Ser. No. 30,104, May 19, 1960. This application July 14, 1961, Ser. No. 126,470
7 Claims. (Cl. 316—27)

The present invention relates to apparatus for manufacturing articles such as incandescent lamps, discharge devices and fluorescent lamps, and more particularly, to automatic apparatus for flashing the filaments of quartz infrared lamps and for seasoning such lamps. This application is a continuation of application S.N. 30,104, filed May 19, 1960, now abandoned, and owned by the present assignee.

In the automatic manufacture of incandescent lamps and discharge devices by automatic apparatus (of the type shown in U.S. Patent No. 2,254,905, issued September 2, 1941, to D. Mullan) such lamps and devices are carried in the heads of a horizontally-disposed turret through a plurality of work stations where automatic tooling is disposed in operative relation to such lamps and devices. Tubular incandescent lamps and fluorescent lamps are automatically manufactured on apparatus of the type shown in U.S. Patent No. 2,671,986, issued March 16, 1954, to C. Wiener. This latter type of machine has two turrets which are disposed either horizontally or vertically, which are provided with lamp-supporting heads and which transport the lamps to the automatic tooling located at the various work stations.

Heretofore, in the case where the automatic tooling associated with the above-mentioned apparatus could not be fixedly mounted in operative relation to the work (i.e. the lamp or device) at a particular work station without interfering with the indexing movement of such work into the work station, the automatic tooling was movably mounted adjacent the work station and moved into operative relation with respect to the work after such work had been indexed into the work station. When the particular automatic tooling was massive in size and in weight, movement of such massive automatic tooling into operative relation with respect to the work was impractical, with the attendant result that many fabricating operations could not heretofore be automated with existing conventional principles and apparatus.

It is the general object of the present invention to avoid and overcome the foregoing and other difficulties of and objections to prior art practices by the provision of lamp-fabricating apparatus which permits the automation of fabricating operations performed by massive tooling.

Another object of the present invention is the provision of a lamp-fabricating apparatus which moves the work into operative relation with respect to fixed massive automatic tooling.

Still another object of the present invention is the provision of automatic apparatus for the flashing of the filaments of quartz infrared lamps of varying length and having an adjustable take-up device for the extended flexible electrical cables, which take-up device cooperates with one adjustable turret of such apparatus.

The aforesaid objects of the present invention, and other objects which will become apparent as the description proceeds, are achieved by providing lamp-fabricating apparatus comprising a movable conveyor, lamp-supporting means carried by said conveyor, movable with respect thereto and operable to support a lamp, means connected to said conveyor for moving said lamp-supporting means and said lamp along a path of movement to a work station, massive fabricating means at said work station for performing a fabricating operation on said lamp, and means at said work station for engaging said lamp-supporting means while said lamp-supporting means is at said work station and for moving said lamp-supporting means and said lamp carried thereby away from said conveyor in order to position said lamp in operative relation with respect to said massive fabricating means so that the latter can perform the fabricating operation on said lamp. When the lamp-fabricating apparatus is employed as a lamp-finishing machine to flash the filaments of infrared quartz lamps of varying length and to season such lamps, a cable take-up device is employed.

For a better understanding of the present invention reference should be had to the accompanying drawings, wherein like numerals of reference indicate similar parts throughout the several views and wherein:

FIG. 3 is an enlarged fragmentary vertical-sectional view along the line III—III of FIG. 4 in the direction of the arrows.

FIG. 4 is a vertical-sectional view along the line IV—IV of FIG. 3 in the direction of the arrows.

Although the principles of the present invention are broadly applicable to the flashing of lamp filaments, the present invention is particularly adapted for the flashing of horizontally and longitudinally disposed filaments of quartz infrared lamps and hence it has been so illustrated and will be so described.

In copending application S.N. 30,269, filed May 19, 1960, now abandoned, and copending application S.N. 99,331, filed February 14, 1961, both owned by the present assignee, are claimed an apparatus for setting a coiled metallic filament wherein the filament is supported by a magnetic field during the so-called flashing operation. The preferred embodiment of the present invention is an improvement over the apparatus which is claimed in these foregoing copending applications.

Figure 1:
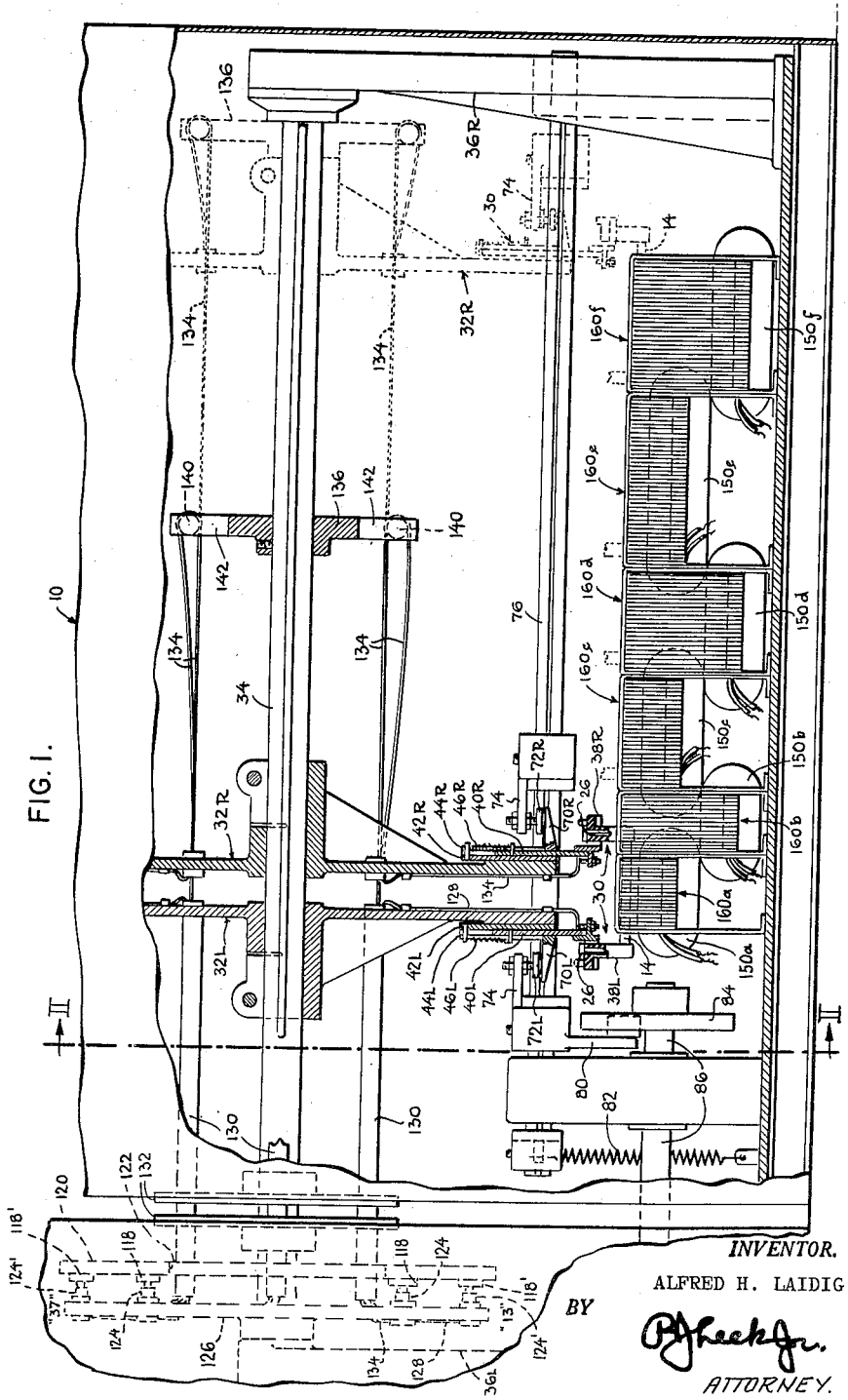
FIG. 1 is a fragmentary side-elevational view, partially in section, of a lamp-finishing machine for flashing the filaments of quartz infrared lamps and for seasoning such lamps and showing the flashing station of such lamp-finishing machine with the improved filament-flashing apparatus of the present invention disposed thereat.
Figure 2:
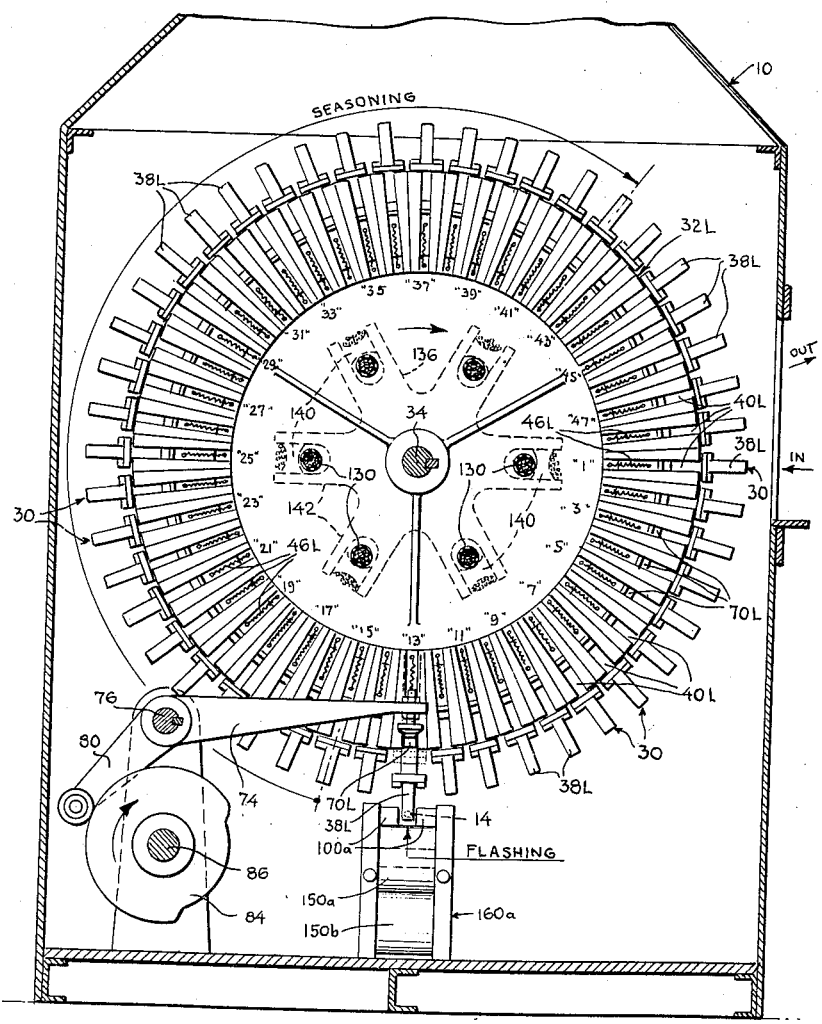
FIG. 2 is an end-elevational view of the lamp-finishing machine along the line II—II of FIG. 1 in the direction of the arrows.

With specific reference to the form of the present invention illustrated in the drawings, and referring particularly to FIGS. 1 and 2, a lamp-finishing machine is indicated generally by the reference numeral 10. This lamp-finishing machine 10 is utilized for flashing a filament 12 (FIG. 9) of a quartz infrared lamp 14 and for seasoning such quartz infrared lamp 14.

Figure 9:
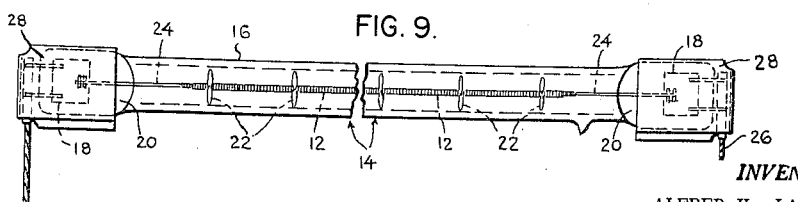
FIG. 9 is a side-elevational view of a quartz infrared lamp which is flashed by the improved method of and apparatus for flashing such lamps and which is seasoned on the lamp-finishing machine.

As shown in FIG. 9, this quartz infrared lamp 14 has an elongated tubular envelope 16 of quartz with the filament 12 extending along the longitudinal axis thereof and connected at each end to a ribbon 18 which is hermetically sealed to a flattened seal portion 20 of the envelope 16. The filament 12 is supported at spaced intervals along its length by discs 22 which are secured to the filament as disclosed in U.S. application Serial No. 861,861, filed December 24, 1959, by William L. Brundige et al. and assigned to the assignee of the present invention. At each end of the quartz infrared lamp 14, a pair of inner lead wires 24 are connected to the ribbon 18 and project from the flattened seal portion 20 for connection to a rigid portion of an outer lead wire 26. This outer lead wire 26 also has a flexible portion extending from a base 28 which encases the flattened seal portion 20, inner lead wires 24, and the rigid portion of the outer lead wire 26.

As shown in FIG. 2 such quartz infrared lamp 14 is manually loaded (as indicated by the arrow and associated legend "IN") into a head 30 of the lamp-finishing machine 10 at Station "1," which lamp-finishing machine 10 and its operation will now be described.

Lamp-Finishing Machine

Figure 7:
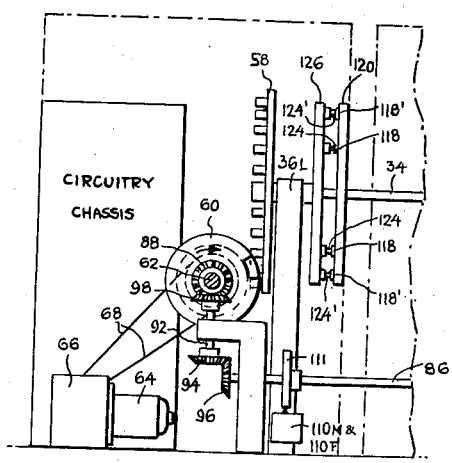
FIG. 7 is a diagrammatic view of the indexing means for the lamp-finishing machine and the drive means for the head-reciprocating mechanism, which diagrammatic view serves as a continuation of the left-hand portion of FIG. 1.

Referring now to FIGS. 1 and 2, it will be noted that the lamp-finishing machine 10 comprises essentially a pair of wheel-like conveyors 32R and 32L which are keyed to a shaft 34 journalled in pedestals 36R and 36L shown in FIGS. 1 and 7. One of the conveyors 32R is movable longitudinally along the shaft 34 and can be secured thereto in any desired position between the solid-line position and the dotted-line position shown in FIG. 1 to accommodate any length of quartz infrared lamp 14. A plurality of lamp holders 38R and 38L (forty-eight are shown in FIG. 2) are mounted in equi-spaced relation on the periphery of the conveyors 32R and 32L respectively with each registering pair of lamp holders 38R and 38L aligned parallel to the shaft 34 to constitute a head 30 for reception of a quartz infrared lamp 14 at Station "1" (FIG. 2).

Since the lamp holders 38R and 38L (FIGS. 1 and 4) are identical it is deemed sufficient to describe the lamp holders 38L, which are shown in FIGS. 2 and 3. It will be understood however that the reference numerals shown in the drawings and followed by the reference letter "R" refer to elements identical to those referred to in the following description and followed by the reference letter "L." Further, in this instance the suffix reference letters "L" and "R" indicate elements on the left and right side respectively of FIG. 1.

In order to permit radial reciprocating movement of each lamp holder 38L, such lamp holder 38L is mounted on a slide 40L (FIGS. 1 and 4) which is retained by a retaining plate 44L in a suitable guide slot in a guide 42L (affixed to the conveyor 32L). So that the lamp holder 38L will be retained in its normally "IN" position shown at Station "1" (FIG. 2) within the guide slot, such slide 40L is biased radially inwardly by a tension spring 46L to the position shown in FIG. 2 as determined by the engagement of an adjustable stop 48L (FIG. 4, carried by the lamp holder 38L) with the conveyor 32L.

As shown in FIG. 4, each lamp holder 38L comprises an electrically insulated body 50L provided with a base-receiving slot 52L and a lead-wire clearance slot 54L. In order to manually load the quartz infrared lamp 14 into the lamp holders 38R and 38L of the head 30 at Station "1," the flexible portions of the outer lead wires 26 are fed through the base-receiving slots 52R and 52L and the lead-wire clearance slots 54R and 54L. The protruding end portions of such outer lead wires 26 are first pulled taut to seat the bases 28 in the base-receiving slots 52R and 52L and are then secured in spring clips 56R and 56L, which serve the dual function of securing the bases 26 in the base-receiving slots 52R and 52L and of functioning as electrical connections for introducing flashing and seasoning current to the quartz infrared lamp 14, as hereinafter explained.

Thereafter, the now loaded head 30 at Station "1" is indexed in clockwise direction, as viewed in FIG. 2, from work station to work station by an indexing mechanism (FIG. 7).

Indexing Mechanism

In order to achieve this indexing movement of the now loaded head 30, a conventional indexing wheel 58 (FIG. 7) is mounted on the shaft 34 adjacent the pedestal 36L and is driven by an indexing cam 60 mounted on a stud shaft 62. The drive means for the indexing cam 60 comprises a motor 64, an associated gear reduction unit 66 and a belt drive 68 connecting the stud shaft 62 to the gear reduction unit 66.

Continued operation of this indexing mechanism indexes the now loaded head 30 and the quartz infrared lamp 14 carried thereby through idle Stations "2"–"12" (FIG. 2) and into Station "13," the filament-flashing station, where the reciprocable head 30 and the quartz infrared lamp 14 are moved radially from their heretofore normally "IN" position (by a head-reciprocating mechanism, FIGS. 1–4) to the position shown in FIGS. 1–4 and into operative relationship with respect to a magnetic-field-producing apparatus disposed adjacent Station "13," preparatory for the filament-flashing operation.

Head Reciprocating Mechanism

When the head 30 indexes into Station "13," the filament-flashing station, pull-down arms 70R and 70L on the slides 40R and 40L respectively pass beneath and into registry with shoes 72R and 72L of the head-reciprocating mechanism, which shoes 72R and 72L are then disposed in the dotted-line positions shown in FIG. 4 a distance "$d$" above the final dwell (dotted-line) positions of the pull-down arms 70R and 70L.

As shown in FIGS. 1–4, the shoe 72R is adjustably mounted on an arm 74 which is adjustably keyed to a rock shaft 76 (FIG. 1) journalled in pedestals 78R and 78L. The shoe 72L is adjustably carried by one end of a lever 80 fixedly keyed to the rock shaft 76, with a roller on the other end of the lever 80 being biased by a spring 82 (FIG. 1) into engagement with a cam 84 on a stud shaft 86. In order to utilize the aforementioned stud shaft 62 (FIG. 7) as the drive means for the shaft 86, a bevel gear 88 on such stud shaft 62 drives a bevel gear 90 on a shaft 92, which shaft 92 then drives the shaft 86 by means of a bevel gear 94 on the shaft 92 and a bevel gear 96 on the shaft 86.

After the head 30 and the quartz infrared lamp 14 carried thereby have indexed into Station "13," the filament-flashing station, the cam 84 rotates the lever 80, the rock shaft 76, the arm 74 and shoes 72R and 72L in clockwise direction, as viewed in FIGS. 2 and 3, against the action of spring 82 (FIG. 1) so that such shoes 72R and 72L first move downwardly a distance "$d$" (FIG. 4) into engagement with the pull-down arms 70R and 70L. Thereafter such shoes 72R and 72L, the now engaged pull-down arms 70R and 70L and the head 30 continue downwardly together (against the action of the springs 46R and 46L) a distance "$d_1$" (FIGS. 3 and 4) from the dotted-line position (FIG. 4) to the solid-line position shown therein, thus disposing the head 30 and quartz infrared lamp 14 transversely between pole pieces 100a (FIG. 3) of the magnetic field-producing apparatus. During this downward movement the shoes 72R and 72L have travelled a total distance "$d_2$" (i.e. "$d+d_1$," FIG. 4). The quartz infrared lamp 14 which is now disposed in the solid-line position shown in FIGS. 3 and 4 is now prepared for the simultaneous energization of a "filament-flashing" circuit (FIGS. 5 and 6) and a "magnetic-field-producing" circuit for the performance of the filament-flashing operation. In the following description the reference numerals followed by suffix reference letters "F" and "M" indicate similar elements associated with the "filament-flashing" circuit and "magnetic-field-producing" circuit respectively.

Filament-Flashing Circuit

Figure 5:
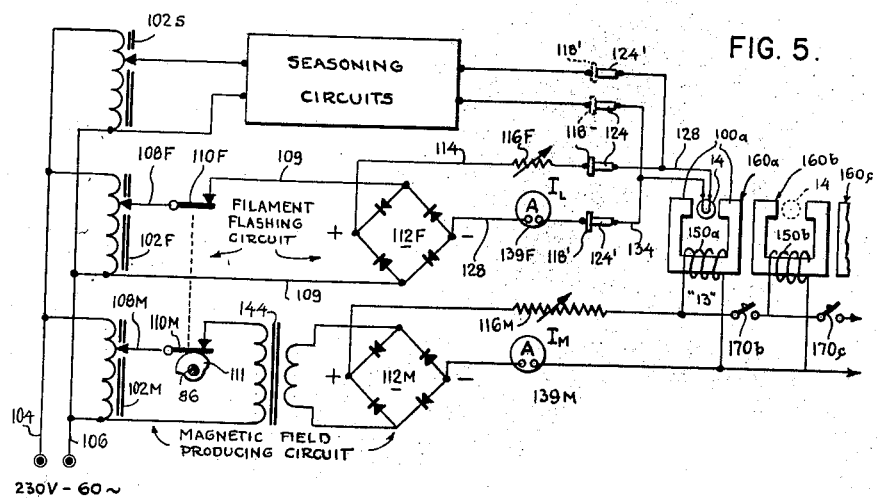
FIG. 5 is a wiring diagram of the "lamp-seasoning" circuits (which are rendered inoperative at the filament-flashing station), and the "filament-flashing" circuit and the "magnetic-field-producing" circuit at the filament-flashing station, both of which latter circuits use direct current.

In the direct-current embodiment of the "filament-flashing" circuit shown in FIG. 5, a variable voltage transformer 102F is connected across line voltage conductors 104 and 106 which extend from a suitable line voltage source indicated by the legend "230 V–60 cycle A.C. Voltage Supply." An output tap 108F of the variable voltage transformer 102F is connected by a line 109 to a cam-operated switch 110F (closable by a cam 111, FIG. 7, on the shaft 86) and thence to the input side of a full-wave rectifier bank 112F and then back to the variable voltage transformer 102F.

A conductor 114 extends from the positive output side of the rectifier bank 112F through a variable resistor 116F to a segmental commutator ring 118 on a stator 120 (FIG. 1) mounted on the frame of the lamp-finishing machine 10 and provided with a central clearance aperture 122. Adjacent Station "13" the segmental commutator ring 118 is of course electrically conducting. Forty-eight brushes 124 (one for each head 30) are carried by a rotor 126 mounted on the shaft 34 and such brushes 124 ride on the segmental commutator ring 118.

In order to connect the brush 124 at Station "13" with the quartz infrared lamp 14 at such station, an input cable 128 extends from such brush 124 through the central aperture 122 and a cable-carrying conduit 130 (mounted on cable-supporting discs 132, FIG. 1, affixed to the shaft 34 and the fixed conveyor 32L) to the spring clip 56L.

To provide a return connection for the quartz infrared lamp 14 to the negative side of the rectifier bank 112F, first an output cable 134 extends from the spring clip 56R around a cable take-up device 136 (FIGS. 1 and 2) through the cable-carrying conduit 130 to a brush 124' on the rotor 126, which brush 124' rides on a second segmental commutator ring 118' on the stator 120. The segmental commutator ring 118' is then connected by a line 128 (FIG. 5) through an ammeter 139F (for indicating lamp current in amperes) to the negative side of the rectifier bank 112F.

It will be understood from a consideration of FIGS. 1 and 2 that each of the six cable-carrying conduits 130 carries eight such input cables 128 and eight such return cables 134, which eight pairs of cables service eight adjacent heads 30.

Further, as shown in FIGS. 1 and 2, the adjustably mounted cable take-up device 136 comprises a radially flanged wheel adjustably mounted on the shaft 34 to take up the slack in the six sets of eight return cables 134. Each of such six sets of eight return cables 134 pass around a roller 140 mounted in an arm 142 of the cable take-up device 136.

Closure of the gang-operated switch 110F and a switch 110M (FIG. 5) in the "magnetic-field-producing" circuit by the cam 111 on the shaft 86 simultaneously energizes the "filament-flashing" circuit and the "magnetic-field-producing" circuit.

Magnetic-Field-Producing Circuit

In the embodiment of this "magnetic-field-producing" circuit shown in FIG. 5, a variable voltage transformer 102M is disposed across the line-voltage conductors 104 and 106 and has its output tap 108M connected through the cam-operated switch 110M to one side of the primary of a step-down transformer 144, with the other side of such primary being returned to the voltage divider 102M. The secondary of the step-down transformer 144 is paralleled with a rectifier bank 112M, the positive output terminal of which rectifier bank 112M being joined through a variable resistor 116M to one side of the coil 150a of a first electromagnet 160a of the magnetic-field-producing apparatus. A suitable line extends from the other side of coil 150a through an ammeter 139M (for indicating magnet current in amperes) to the negative side of the rectifier bank 112M.

In order to accommodate quartz infrared lamps 14 of greater length than the lamp 14 shown in FIGS. 1 and 4, coils 150b, 150c etc. of other electromagnetics 160b, 160c, etc. respectively (shown in FIG. 1 and diagrammatically in FIG. 5) can be placed in parallel with the coil 150a of the first electromagnet 160a and energized by manual closure of switches 170b, 170c, etc. respectively.

Having described the "magnetic-field-producing" circuit which constitutes the major portion of the "magnetic-field-producing" apparatus the description of such apparatus will now be completed.

Magnetic-Field-Producing Apparatus

As shown in FIGS. 1 and 4, the magnets 160a, 160b, etc. have different lengths and are positioned adjacent each other to accommodate the various lengths of the different types of quartz infrared lamps 14. Additionally, in order to provide a continuous uniform magnetic field along each longitudinal horizontally-disposed filament 12, the coil 150b, for example, of magnet 160b is disposed below (and also slightly overlaps) the coils 150a and 150c of adjacent magnets 160a and 160c respectively.

Closure of the gang-operated switches 110F and 110M by the cam 111, as hereinbefore mentioned, simultaneously energizes the "filament-flashing" circuit and the "magnetic-field-producing" circuit. Energization of the "filament-flashing" circuit causes a current to flow through the filament 12 to raise it to its temperature of recrystallization while the latter circuit enables the magnetic-field-producing apparatus to provide a magnetic field around the filament 12. The force on the current-carrying filament 12, exerted by the magnetic field at right angles to both the motion of the current and the direction of the magnetic field cancels the force of gravity on such filament 12 during the filament-flashing operation, will now be explained in detail.

The filament 12 (which for purposes of illustration only will be assumed to be a filament for use in a 500 watt quartz infrared lamp 14) has the following characteristics:

| | |
|---|---|
| Wire diameter | 0.0091" or .0231 cm. |
| Filament I.D. | 0.044" or 0.112 cm. |
| Filament T.P.I. | 88.7. |
| Filament T.P. cm. | 34.9. |
| Wt. of filament | 0.117 grams/cm. |

Hence, the magnetic field produced by the magnetic-field-producing apparatus must exert an upward force of 0.117 grams/cm.×980 or 114.66 dynes/cm. The length of tungsten wire/cm. in the filament 12 is ($\pi$) (filament I.D. in cm.) (turns/cm.) or ($\pi$) (0.112) (34.9)=12.23 cm. of tungsten wire in 1 cm. of filament length. As a result the required upward force in dynes/cm. of length of tungsten wire is $$\frac{114.66}{12.23}$$

or 9.36 dynes/cm. of tungsten wire.

As is well known in the art, the force (F) in dynes exerted by a magnetic field or a current-carrying conductor is related to the density of the magnetic field (B) in gausses; the current in the conductor ($I_L$) in amperes; and a constant K by the following formula:

$$F=KI_L B$$

Figure 8:
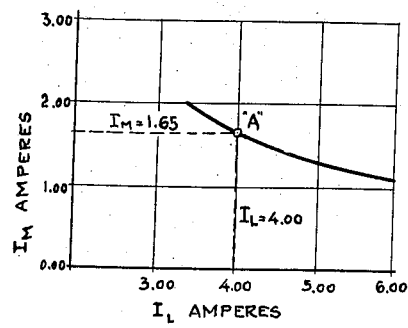
FIG. 8 is a graph of the magnet current ($I_M$) in amperes versus lamp current ($I_L$) in amperes.

Since in the instant case the conventional current carrying conductor is replaced by the helix-shaped filament 12 disposed perpendicular to the magnetic field, the constant K is fairly complex and was determined experimentally by reading the magnet current ($I_M$) on the ammeter 139M and the lamp current ($I_L$) on the ammeter 139F immediately prior to the point of lift of the filament 12 by the magnetic field. These results are shown in FIG. 8.

The magnetic field intensity (B) in gausses is obtained from the magnetic current ($I_M$) in amperes by the following relationship:

$$B = \frac{360 \times I_M}{4 \times 2.0213} = 44.5258(I_M)$$

where
360=No. of turns in the magnet 160a
4=inches in the length of the pole pieces 160a
2.0213=No. of ampere turns in 1 gauss absolute.

In the calculation of the constant K the force (F) in dynes exerted by the magnetic field was considered as 9.36 dynes/cm. of tungsten wire in the filament 12.

Hence K (calculated) equals $\frac{9.36}{I_L B}$ or $\frac{9.36}{I_L(44.5258)I_M}$ As an example it will be noted from FIG. 8 that equilibrium is obtained at point "A" on the curve when $I_L=4.0$ and $I_M=1.65$, whence $$K = \frac{9.36}{(4.0)(44.5258)(1.65)} = .0318 \text{ or approximately } \frac{1}{10\pi}$$

After a predetermined scheduled period of time (as determined by the cam 111), the gang-operated switches 110F and 110M are opened by the cam 111 thus deenergizing the "filament-flashing" circuit and "magnetic-field-producing" circuit. The flashed filament 12 is now sufficiently recrystallized to permit further flashing under the full force of gravity at Station "14" if desired. The spring 82 of the head-reciprocating mechanism and the springs 46R and 46L of the head 30 then cause retraction of such head-reciprocating mechanism, the head 30 and the now-flashed quartz infrared lamp 14 carried thereby from the solid-line position shown in FIGS. 1–4 to the dotted-line position shown in FIGS. 3 and 4, preparatory for the indexing movement of the head 30 to Station "14," a normally idle station, which may be employed for further filament-flashing to complete recrystallization of the filament 12.

From Station "15" through Station "42" the quartz infrared lamp 14 is seasoned by operation of a plurality of "lamp-seasoning" circuits, FIG. 5.

*Lamp-Seasoning Circuits*

These "lamp seasoning" circuits, one for each seasoning station, each comprise a variable-voltage transformer 102S (FIG. 5) connected across the line-voltage conductors 104 and 106 and also to the input side of the individual "seasoning" circuit (indicated by the legend "Seasoning Circuits"). The output side of the "seasoning" circuit is joined to a conducting segment of the hereinbefore mentioned commutator rings 118 and 118' and then through the brushes 124 and 124' respectively to the quartz infrared lamp 14.

At Station "47," the discharge station, the outer lead wires 26 of the now flashed and seasoned quartz infrared lamp 14 are removed from the spring clips 56R and 56L and the lamp 14 taken out of the head 30.

It will be recognized by those skilled in the art that the objects of the present invention have been achieved by the provision of automatic lamp-fabricating apparatus which moves the work away from its normal path of movement and into operative relation with respect to fixed massive automatic tooling, thus permitting the automation of the fabricating operations performed by such massive tooling. When the automatic apparatus of the present invention is employed as a lamp-finishing machine for the flashing of the filaments of quartz infrared lamps of varying length, an adjustable take-up device for the extended flexible electrical cables of such apparatus is employed for cooperation with an adjustable turret of such apparatus.

Figure 6:
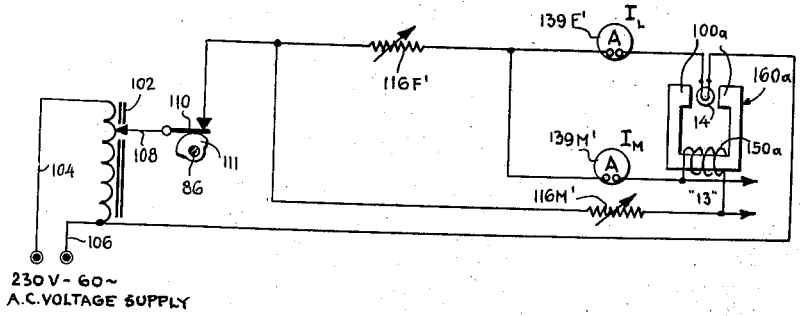
FIG. 6 is a view similar to FIG. 5 of an alternative embodiment of the "filament-flashing" circuit and the "magnetic-field-producing" circuit using alternating current therein.

As an alternative embodiment of "filament-flashing" circuit and "magnetic-field-producing" circuit reference is made to FIG. 6 wherein a variable voltage transformer 102 is shown disposed across the line-voltage conductors 104 and 106. An output tap 108 of such variable-voltage transformer 102 is connected to a switch 110 closable by operation of the cam 111 on the stud shaft 86. The "magnetic-field-producing" circuit is disposed in parallel about a variable resistor 116F' in the "filament-flashing" circuit and comprises the variable resistor 116M', the coil 150a of the first magnet 160a and an ammeter 139M' (for reading the magnetic circuit in amperes) and the filament 12 of the quartz infrared lamp 14.

While in accordance with the patent statutes a preferred embodiment of the present invention has been illustrated and described in detail it is to be particularly understood that the invention is not limited thereto or thereby.

I claim:

1. Fabricating apparatus for a lamp, comprising a movable conveyor, lamp-supporting means carried by said conveyor, movable with respect thereto and operable to support said lamp, drive means connected to said conveyor for moving said lamp-supporting means and said lamp along a path of movement to a work station, massive fabricating means at said work station for performing a fabricating operation on said lamp, and means at said work station for engaging said lamp-supporting means while said lamp-supporting means is at said work station and for moving said lamp-supporting means and said lamp carried thereby away from said conveyor in order to position said lamp in operative relation with respect to said massive fabricating means thereby permitting the latter to perform the fabricating operation on said lamp.

2. Fabricating apparatus for a lamp comprising a movable conveyor, lamp-supporting means slidably mounted on the periphery of said conveyor for movement away from and toward said periphery and operable to support said lamp, biasing means connected to said lamp-supporting means for normally maintaining said lamp-supporting means on said periphery, drive means connected to said conveyor for moving said lamp-supporting means and said lamp along a peripheral path of movement to a work station, massive fabricating means disposed at said work station away from said peripheral path of movement for performing a fabricating operation on said lamp, and means at said work station for engaging said lamp-supporting means while said lamp-supporting means is at said work station and for moving said lamp-supporting means and said lamp carried thereby away from said periphery against the action of said biasing means in order to position said lamp in operative relation with respect to said massive fabricating means thereby permitting the latter to perform the fabricating operation on said lamp.

3. Fabricating apparatus for a lamp, comprising a movable conveyor, lamp-supporting means carried by said conveyor, movable with respect thereto and operable to support said lamp, drive means connected to said conveyor for moving said lamp-supporting means and said lamp along a path of movement to a work station, massive fabricating means at said work station for performing a fabricating operation on said lamp, conduit take-up means mounted in adjustable spaced relation with respect to said movable conveyor for movement therewith, a plurality of flexible conduits of extended length connected to said lamp-supporting means and extending around and supported by said conduit take-up means to eliminate slack therein, and means at said work station for engaging said lamp-supporting means while said lamp-supporting means is at said work station and for moving lamp-supporting means and said lamp carried thereby away from said conveyor in order to position said lamp in operative relation with respect to said massive fabricating means, thereby permitting the latter to perform the fabricating operation on said lamp.

4. Fabricating apparatus for a lamp, comprising a movable conveyor, lamp-supporting means slidably mounted on the periphery of said conveyor for movement away from and toward said periphery and operable to support said lamp, biasing means connected to said lamp-supporting means for normally maintaining said lamp-supporting means on said periphery, drive means connected to said conveyor for moving said lamp-supporting means and said lamp along a peripheral path of movement to a work station, conduit take-up means mounted in adjustable spaced relation with respect to said movable conveyor for movement therewith, a plurality of flexible conduits of extended length connected to said lamp-supporting means and extending around and supported by said conduit take-up means to eliminate slack therein, massive fabricating means disposed at said work station away from said peripheral path of movement for performing a fabricating operation on said lamp, and means at said work station for engaging said lamp-supporting means while said lamp-supporting means is at said work station and for moving said lamp-supporting means and said lamp carried thereby away from said periphery against the action of said biasing means in order to position said lamp in operative relation with respect to said massive fabricating means, thereby permitting the latter to perform the fabricating operation on said lamp.

5. Apparatus for performing a fabricating operation on an article, said apparatus comprising, a movable conveyor, article supporting means on said conveyor for receiving and retaining said article, article fabricating means positioned adjacent to the path of said conveyor for performing a fabricating operation on the article received and retained by said article supporting means, drive means connected to said conveyor for moving said article supporting means along the path of said conveyor and to and from a position proximate to said article fabricating means, and actuating means for moving said article supporting means and the article supported thereby from the path of movement of said conveyor and into operative association with said article fabricating means when said conveyor moves said article supporting means to a position proximate to said article fabricating means to permit said article fabricating means to perform a fabricating operation on the article carried by said article supporting means.

6. Fabricating apparatus for a lamp, said apparatus comprising, a movable lamp-supporting means adapted to support and move a lamp along a predetermined path, a work station positioned proximate to the predetermined path of movement of the lamp carried by said lamp-supporting means, drive means for moving said lamp-supporting means and the lamp carried thereby along the predetermined path of movement to and from a position proximate to said work station, lamp-fabricating means located at said work station, and actuating means for moving said lamp-supporting means and the lamp carried thereby out of the predetermined path of movement and to said lamp-fabricating means when said lamp-supporting means and the lamp carried thereby are moved proximate to said work station by said drive means.

7. Fabricating apparatus for an article, said apparatus comprising, means for moving a supporting means and a partially fabricated article supported thereby along a predetermined path, a work station positioned proximate to the predetermined path along which said supporting means and said partially fabricated article supported thereby are moved, and actuating means for moving said supporting means and said partially fabricated article supported thereby from their predetermined path to said work station when said supporting means and said partially fabricated article supported thereby are moved along their predetermined path to a position proximate to said work station.

References Cited in the file of this patent
UNITED STATES PATENTS

| | | |
|---|---|---|
| 2,573,416 | Eddy | Oct. 30, 1951 |
| 2,773,731 | Chick et al. | Dec. 11, 1956 |
| 2,791,316 | Mullan et al. | May 7, 1957 |
| 2,855,088 | Moses | Oct. 7, 1958 |
| 2,901,130 | Thomas | Aug. 25, 1959 |
| 2,959,267 | Boutilliei et al. | Nov. 8, 1960 |